United States Patent [19]

Lammlein, Jr.

[11] 4,163,683
[45] Aug. 7, 1979

[54] FORMING A TIRE BEAD ASSEMBLY

[75] Inventor: Robert A. Lammlein, Jr., Akron, Ohio

[73] Assignee: The Goodyear Tire & Rubber Company, Akron, Ohio

[21] Appl. No.: 864,952

[22] Filed: Dec. 27, 1977

[51] Int. Cl.² ............................................. B29H 17/32
[52] U.S. Cl. .................................. 156/136; 156/401; 156/422; 156/460
[58] Field of Search ............... 156/123, 135, 136, 131, 156/132, 394, 398, 400–403, 414–420, 422, 460

[56] References Cited

U.S. PATENT DOCUMENTS

| 3,185,607 | 5/1965 | Nebout | 156/401 |
| 3,895,986 | 7/1975 | Komatsu et al. | 156/136 |
| 4,060,445 | 11/1977 | Houck et al. | 156/414 |
| 4,087,298 | 5/1978 | Mangun et al. | 156/136 |

Primary Examiner—John E. Kittle
Attorney, Agent, or Firm—R. S. Washburn

[57] ABSTRACT

A tire bead assembly of a bead core, apex and gum tie strip is made by laying the gum tie strip about a noninflatable annular member of triangular cross-section and across the slant surface of the member. The apex is wrapped then about the tie strip and about the slant surface of an annular inflatable bag. After the core is pressed coaxially on the tie strip so as to indent the member and thus preform the tie strip, the bag is inflated to turn the apex and underlying tie strip about the core and against an annular forming member to shape the assembly suitably for the tire carcass in which it is to be inserted. A bladder is then inflated to wrap the tie strip on the second side of the core and apex. The member bridges the gap between the adjacent edges of the bag and the bladder. An apparatus for carrying out the steps is also described. The resulting bead assembly is tightly cohered and free of wrinkles and air pockets. The foregoing abstract is not to be taken as limiting the invention of this application, and in order to understand the full nature and extent of the technical disclosure of this application, reference must be made to the accompanying drawing and the following detailed description.

4 Claims, 2 Drawing Figures

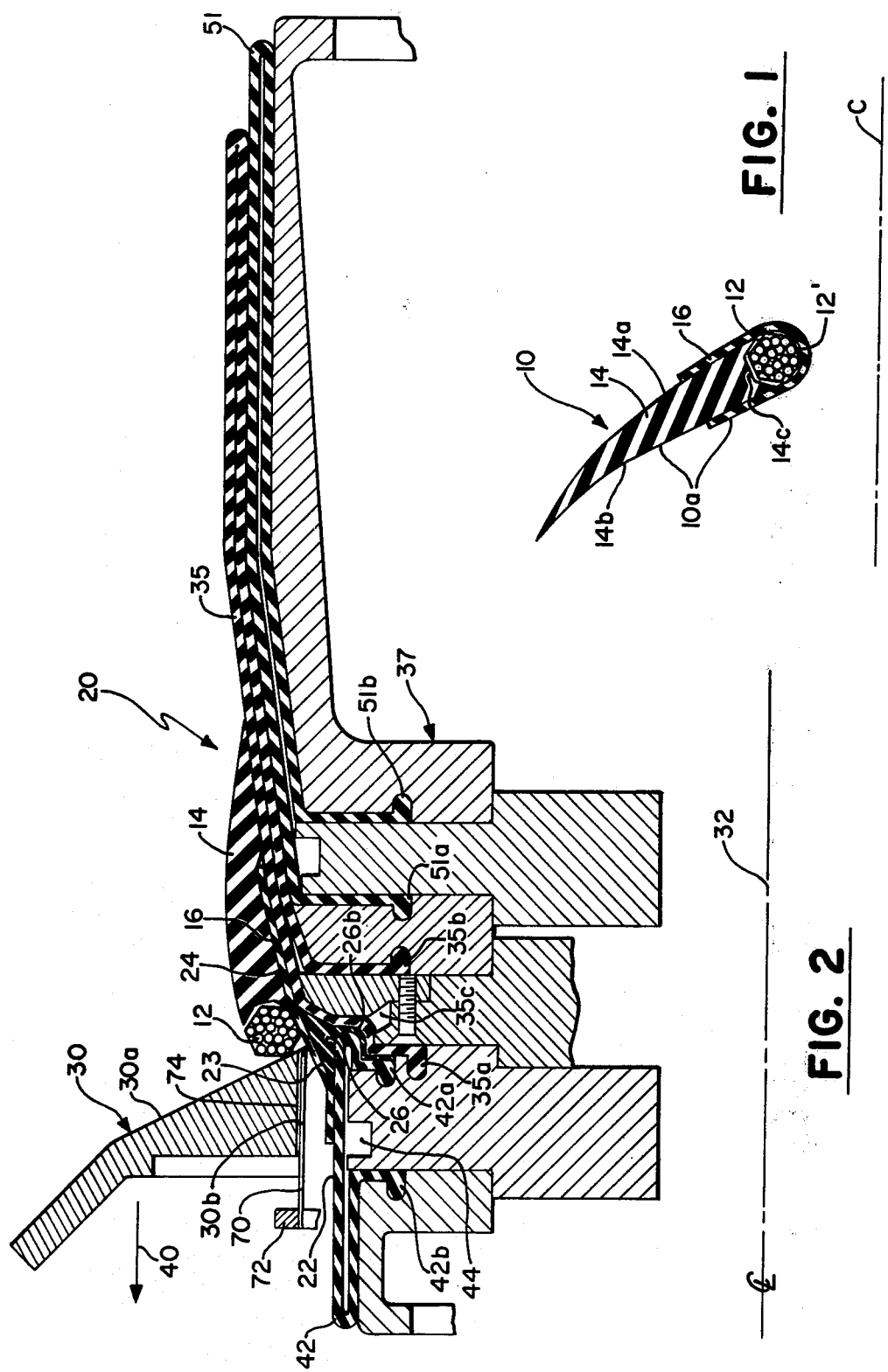

FORMING A TIRE BEAD ASSEMBLY

The present invention relates to the manufacture of tires and particularly to a method and apparatus for making a tire bead assembly which assembly includes an inextensible bead core, an apex, and a gum tie strip.

The objects of the invention are to provide an improved method and an improved apparatus for making a tire bead assembly which assembly can be inserted in a tire more conveniently than can the individual components separately. The tire bead assembly includes an inextensible bead core, an apex, and a gum tie strip. It is desired that the assembly be securely cohered into an integral unit which can be readily placed on a carcass in a conventional tire building machine, that the assembly be free of wrinkles or inclusions of air or other foreign material, and that the assembly have a shape particularly adapted to the proper placement thereof relative to the tire carcass during the tire building operation.

These objects and others which will become apparent as the following description proceeds are accomplished by a method comprising wrapping a gum tie strip of predetermined width circumferentially about support means, said support means being rotatable about an axis and comrising a cylindrical surface having a diameter less than the inside diameter of said bead core, said cylindrical surface being provided by an inflatable bladder, a conical surface having a tie strip supporting portion greater in diameter than the inside diameter of said bead core and sloping radially outwardly of said axis and axially away from said cylindrical surface, said conical surface being provided by an inflatable bag, and a third surface extending slopingly from said cylindrical surface to said conical surface at said portion, said third surface being provided by a non-inflatable elastically deformable circumferential member or triangular cross-section, said member having a fabric web extending therefrom and secured radially inwardly of and between the adjacent ends of said cylindrical surface of said conical surface, the width of said gum tie strip being sufficient to span said third surface and overlie portions of said conical and of said cylindrical surface respectively adjacent said third surface, moving said bead core coaxially or said support means to coaxial contact with said gum tie strip and to indent circumferentially said third surface thereby to conform said surface and said gum tie strip in endless circumferential relation partially to wrap said gum tie strip about said bead core free of wrinkles or air pockets therebetween, wrapping said apex circumferentially about said gum tie strip on said conical surface such that the bead core engaging portion of the apex lies in a plane perpendicular to said axis and closely adjacent said bead core, inflating said bag and urging it axially toward said bead core thereby to rotate the major axial dimension of said apex strip and a first portion of said gum tie strip angularly at least 90 degrees about said bead core from an initial position on said conical surface to an angular position with respect to said initial position to cohere said bead engaging portion of said apex and the radially outward surface of said bead core with said first part of the width of said gum tie strip overlying said cohering on said bead core and said apex, then inflating said bladder thereby to wrap the other part of the width of said gum tie strip to overlie and cohere with said bead core and said apex, then removing said bead assembly from said support means for insertion in a tire.

These objects and others which will become apparent from the following description are also accomplished by an apparatus particularly adapted to carry out the foregoing method, which apparatus comprises circumferential continuous support means rotatable about an axis and comprising a cylindrical surface having a diameter less than the inside diameter of said bead core, said cylindrical surface provided by a first inflatable means, a conical surface having a reference diameter greater than the inside diameter of said bead core and sloping radially outward and axially away from said cylindrical surface, said conical surface provided by a second inflatable means, and a third surface extending slopingly from said cylindrical surface to said conical surface, said third surface provided by a non-inflatable elastically deformable circumferential member of triangular cross-section having an annular fabric web attached integrally to said member and secured radially inwardly of and between the adjacent ends of said cylindrical and said conical surface, annular forming means mounted for movement coaxially of said support means for placing said bead core coaxially of said support means including a rigid ring having a radially inner surface having a diameter greater than the outside diameter of said first inflatable means and having a first annular surface sloping radially outwardly and axially away relatively of said support means at an angle of from 25 to 30 degrees, said sloping surface being roughened as by knurling, and centering means comprising a circular array of deformable spring fingers disposed immediately adjacent and outwardly of the radially inner surface of said annular forming means and movable coaxially relatively of said forming means to extend said fingers outwardly beyond said first annular surface and to retract and fingers axially inward with respect to said sloping surface, and means for selectively inflating said first and said second bladder.

To acquaint persons skilled in the arts most closely related to the present invention, certain preferred embodiments thereof illustrating a best mode now contemplated for putting the invention into practice are described herein by and with reference to the annexed drawings forming a part of the specification. The embodiments shown and described herein are illustrative and as will become apparent to those skilled in these arts can be modified in numerous ways within the spirit and scope of the invention defined in the claims hereof. In the drawings:

FIG. 1 shows a tire bead assembly in an axial cross-section;

FIG. 2 illustrates in axial cross-section an apparatus in accordance with the invention;

A tire bead assembly typical of the tire bead assembly with which the present methods and apparatus are concerned is shown in FIG. 1. The bead assembly 10 includes an inextensible bead core 12 in which a plurality of turns of bead wire insulated with uncured gum rubber are formed in as a circular ring. In cross-section, the core may occupy a hexagonal form as illustrated in FIG. 1. The core 12 can have as well any of the generally known cross-sectional configurations of bead cores. The radially inner surface 12' of the core 12 may be parallel to or inclined with respect to the center axis of the bead. The radial and axial dimensions of the ring cross-section can be, but are not necessarily equal, as illustrated in FIG. 1. The axial dimension can be greater than the radial dimension by a factor of from 1.2 to 1.7 or more as dictated by the particular size and type of tire to be built in which the tire bead assembly is to be inserted.

The assembly 10 includes an apex 14, which is a strip, commonly extruded of uncured rubbery material, having a cross-section which is generally triangular, the two long sides 14a and 14b of which extend outwardly from a base 14c to be joined coherently to the bead core 12 and which long sides converge outwardly from the bead core. Preferably, the base 14c is concave, generally as shown in FIG. 1. As is well known, the apex is inserted in a tire to fill the space between the ply carcass extending to the other of the two beads of the tire and the outer edge portion of the carcass ply which is turned around the bead so as to secure the carcass ply to the bead core.

The gum tie strip 16 of the bead assembly is an uncured strip of rubbery material, generally rectangular in cross-section and having a width from edge to edge many times the thickness of the tie strip. The tie strip is incorporated in the tire bead assembly to cushion the cords or wires of the tire carcass ply where the same is turned about the core, to assist in sealing the join between the apex and the core and to provide an integral tire bead assembly easily handled and transported.

It is also desired that the tire bead assembly be circular and without radial irregularities throughout its circumference in order that the tire in which the assembly is inserted not have its circumferential uniformity impaired.

It is further desirable that the side 10a of the tire bead assembly have a particular contour adapted to cooperate with the form of the tire carcass disposed on the selected tire building machine on which the bead assembly 10 will be placed. Later herein, ways and means of forming the preferred contour will be explained in greater detail.

According to the method of the present application, an apex strip is formed, usually as an extrusion of an uncured, curable rubbery material compatible with the tire in which the tire bead assembly will be inserted. The apex has a cross-section of generally triangular shape having two sides which are longer than the third side or base thereof. The apex can be supplied for the operation about to be described either in continuous running length or in the form of precut lengths suited to the circumference of the bead core of the assembly.

There is also supplied a gum strip having a cross-section of generally rectangular form and of greater width than thickness. The gum strip can also be supplied either in continuous running length of in precut lengths suited to the circumference of the bead core of the tire bead assembly.

Referring to FIG. 2 wherein is shown an axial cross-section of an apparatus 20 particularly adapted for making the bead assembly 10 and presently to be described in greater detail. The gum tie strip 16 is wrapped circumferentially around a means providing a continuous circumferential support having three axially adjacent distinct surfaces. The strip is cut to length and spliced to endless form on the support means. The strip width is disposed axially of the support means such that a portion of its width lies on cylindrical surface 22 and another portion of its width lies on a conical support surface 24. The strip spans a third surface 23 extending between the cylindrical and the conical surfaces which is provided by a member 26 of triangular cross-section presently to be described in greater detail.

With the gum strip disposed as described on the support means, the inextensible bead core 12 placed on the rigid ring 30, concentrically with respect to the common axis 32 of the ring and of the support means, is then moved coaxially by the ring to engage the tie strip 16 overlying the member 26 as can be seen in FIG. 2. The ring 30 and bead core are moved over the support means a distance sufficient to cause the bead core to indent both the gum tie strip 16 and the member 26 sufficiently to cause the tie strip to be conformed to the radially inward surface of an initially partially around the bead core.

The yieldable sloping surface of the member 26 provides not only for firmly and uniformly conforming the tie strip 16 to the bead core free of wrinkles and inclusions, but also enables a variety of bead cores to be accommodated by the apparatus 20.

The apex 14 is then wrapped about the support means such that the base 14c or bead-engaging portion overlies a portion of the width of the tie strip 16 close to or touching the bead core 12 and such that one 14a of the two sides extends axially and radially outwardly relatively of the core 12 at an angle of at least 10 degrees relatively of the axis 32.

Alternatively, the apex 14 can be wrapped about the support means and spliced before the bead core 12 is applied to the tie strip. It is preferred, however, that the apex be applied to the support means after the bead core is placed. The core 12 itself provides a useful guide about the conical surface 24 for correct placement of the apex.

The slope of the conical surface on which an apex is applied has been determined empirically and amounts to about 15 degrees with respect to the axis 32 of the support means. No theoretical explanation has been developed, but the slope of about 15 degrees has been found both to facilitate the wrapping of the apex around the support means and to assure more satisfactory coherence between the apex and the bead core, when the inflatable bag 35 which provides the conical surface 24 is inflated, to rotate the apex 14 angularly with respect to the axis 32 and about the bead core. The greater slope of the surface 23 provided by the non-inflatable member 26, being about 20 to 25 degrees to the axis 32, enables the bead core to be pressed into the gum strip by the ring 30 so as to initiate the wrapping and conformity of the tie strip 16 with the bead core 12 before the bag 35 is inflated.

When the bag providing the conical surface 24 is inflated, its circumferential expansion is accompanied by an axial contraction. This contraction together with the inflation pressure in the bag serves to compact and to cohere the apex 14 firmly and uniformly to the bead core 12 around its circumference. Inflation of the bag also operates to move the apex 14 angularly beyond the plane of the core, with respect to the support means, and against the ring 30 causing the apex to conform to the surface contour 30a of the carrier and to take the shape desired to suit the form of the carcass on the tire building drum. The bag 35, when inflated, can be urged axially toward the ring 30 by an annular inflatable tube 51.

The ring 30 is then moved away from the support means, as indicated by the arrow 40, and from the core, apex, and gum strip thereon, after which the bladder 42 providing the cylindrical support surface 22 is inflated. Inflation of the bladder 42 also expands the adjacent portion of the deformable triangular cross-section member 26, and causes the portion of the width of the tie strip thereon to wrap about and to conform with the side 14b of the apex so as to wrap the tie strip snugly about the bead core and cohere to the apex 14.

After the bladder 42 is deflated, the completed bead assembly 10 so formed is removed for transport to and insertion in a tire at the tire building machine.

The apparatus 20 for carrying out the described method is illustrated in FIG. 2. The apparatus includes circumferentially continuous support means for supporting respectively the tie strip 16, the core 12, and the apex 14, comprising the conical surface 24 having a tie strip supporting portion greater in diameter than the inside diameter of said core and sloping therefrom radially and axially outward from the plane of said core. The conical surface 24 is provided by the inflatable bag 35 which is carried on a rigid drum 37, the circumferential surfaces of which are formed to position and support the outer surface 24 of the bag, when not inflated, at the desired slope, about 15 degrees. The bag when deflated extends axially away from said plane in a closed loop. The edges 35a, 35b of the bag are fixed in the drum adjacent to said plane and means 35c for admitting inflation air into the bag is disposed in the drum between the respective edges of the bag.

In order to urge the bag 35, when the same is inflated, axially toward and over the bead core 12, the drum includes an inflatable tube 51 having circumferential edges 51a, 51b fixed on the drum 37. The outer loop of the tube 51 underlies the bag 35 and extends axially outwardly a short distance beyond the loop end of the bag 35. Means 53 for admitting inflation air to the tube 51 are provided to inflate the latter so as to urge the inflated bag axially toward and over the bead core.

The drum 37 is mounted for rotation about the central axis 32 in a conventional manner in order to facilitate the placement of the tie strip and of the apex.

The support means further comprises the cylindrical surface 22 having a diameter less than the inside diameter of the bead core 12 which cylindrical surface is provided by the inflatable bladder 42. The first circumferential edge 42a of the second bladder is disposed closely adjacent the edge 35a of the bag. The second circumferential edge 42b of the second bladder is spaced from the first edge, both edges being fixed in the drum 37. Means 44 for admitting inflation air to the bladder 42 is provided between the two edges thereof.

The support means includes also a third surface 23 which extends slopingly from the cylindrical surface 22 to the conical surface 24 of the bag 35 beyond the plane of the core 12, when disposed therearound. In accordance with the invention, the third surface 23 is provided by a non-inflatable, elastically deformable, circumferential member 26 which has an axial cross-section of triangular form and which has attached integrally thereto an annular fabric web 26b which extends radially inwardly of and between the adjacent ends of the bag 35 and the bladder 42 to secure the member 26 to the drum.

The member is molded of a polyurethane having a tough surface skin and an elastically deformable foamed interior such that the member can be repeatedly deformed partially to envelop successive bead cores placed thereover and thereby to conform a tie strip about a bead core. In addition to securing to the drum the triangular foam-filled cross-section part of the member 26, the fabric web 26b extends integrally into the triangular section part and there serves to reinforce the foam-filled, tough skinned member, thereby to extend its useful working life materially with respect to a member lacking the fabric-reinforcing web.

The apparatus 20 further comprises rigid annular forming means, for placing the bead core and for forming the desired contour of the bead assembly, mounted for movement coaxially of the support means to place the bead core coaxially on the support means and to press the same axially to indent the tie strip and the underlying support means in the manner already described. The forming means includes a rigid ring 30 having a radially inner surface 30b greater in diameter than the diameter of the cylindrical surface 22 of the bladder 42 when uninflated. The forward surface 30a of the ring, oriented toward the drum 37, is provided with a surface contour chosen to provide in the tire bead assembly 10 a contour suitable to the tire carcass on the building drum to which the bead assembly will be applied. This contour 30a, as seen in FIG. 2, provides a first annular surface part sloping outwardly and away relatively of the support means at an angle of from 25 to 30 degrees and a second annular surface part outward of the first part and sloping away radially and axially from the support means at an angle of approximately 44 degrees. The junction of the first and second annular surface parts is provided with a radius so as to relieve the sharp intersection line between the respective annular surface parts.

The contour 30a of the ring is preferably roughened as by knurling. It has been found that the carrier 30 can be moved away from the apex 14 and bead core without distortion thereof more readily when the carrier surface is roughened than when such surface is smoothly finished.

To assist in holding the bead core 12 concentrically of the axis 32, the carrier 30 may be magnetized or provided with inset magnets.

In order to insure the initial location of the bead core concentrically when the same is applied to the ring 30, the ring has a circumferential array of spring fingers 70 each fixed to and extending from a ring 72 which is mounted for axial movement relative to the ring 30. The spring fingers 70 are each accommodated in a corresponding slot 74 sunk in the inner surface 30b so as to avoid any interference with the bladder 42 as the carrier is moved axially thereover. As the carrier is moved toward the support means, the spring fingers are retracted axially, leaving the bead core supported on and only by the ring 30.

While certain representative embodiments and details have been shown for the purpose of illustrating the invention, it will be apparent to those skilled in the art that various changes and modifications may be made therein without departing from the spirit or scope of the invention.

What is claimed is:

1. A method of making a tire bead assembly which assembly includes an inextensible bead core, an apex, and a gum tie strip, said method comprising wrapping a gum tie strip of predetermined width circumferentially about support means including a non-inflatable member having readily and significantly deformable elastic member of conical form, said member being disposed axially adjacent and between an inflatable bag and an inflatable bladder which bag and bladder when not inflated are resistant to indentation, and pressing said bead core axially against said gum tie strip overlying said member to significantly indent said member without indenting said bag and then further expanding an axial portion of the uninflatable member to conform said member and said gum tie strip in endless circumferential relation partially to wrap said tie strip about said bead core free of wrinkles or air pockets therebetween.

2. A method of making a tire bead assembly which assembly includes an inextensible bead core, an apex, and a gum tie strip, said method comprising wrapping a gum tie strip of predetermined width circumferentially about support means, said support means being rotatable about an axis and comprising a cylindrical surface having a diameter less than the inside diameter of said bead core, said cylindrical surface being provided by an inflatable bladder, a conical surface having a tie strip supporting portion greater in diameter than the inside diameter of said bead core and sloping radially outwardly of said axis and axially away from said cylindrical surface, said conical surface being provided by an inflatable bag, and a third surface extending slopingly from said cylindrical surface to said conical surface at said portion, said third surface being provided by a non-inflatable elastically deformable circumferential member of triangular cross-section, said member having a fabric web extending therefrom and secured radially inwardly of and between the adjacent ends of said cylindrical surface and said conical surface, the width of said gum tie strip being sufficient to span said third surface and overlie portions of said conical and of said cylindrical surface respectively adjacent said third surface, urging said bead core coaxially of said support means to coaxial contact with said gum tie strip and sufficiently farther significantly to indent circumferentially and axially said third surface thereby to conform said surface and said gum tie strip in endless circumferential relation partially to wrap said gum tie strip about said bead core free of wrinkles or air pockets therebetween, wrapping said apex circumferentially about said gum tie strip on said conical surface such that the bead core engaging portion of the apex lies in a plane perpendicular to said axis and closely adjacent said bead core, inflating said bag and urging it axially toward said bead core thereby to rotate the major axial dimension of said apex strip and a first portion of said gum tie strip angularly about said bead core from an initial position on said conical surface to an angular position of at least 90 degrees with respect to said initial position to cohere said bead engaging portion of said apex and the radially outward surface of said bead core with said first part of the width of said gum tie strip overlying and cohering on said bead core and said apex, then inflating said bladder thereby to expand a portion of said non-inflatable member to wrap the other part of the width of said gum tie strip to overlie and cohere with said bead core and said apex, then removing said bead assembly from said support means for insertion in a tire.

3. A method as claimed in claim 2, wherein said moving includes holding said bead core in said contact by profile forming means, and forming said assembly by interaction of said bag and said forming means whereby said assembly is adapted for placement relative to a tire carcass.

4. An apparatus for making a tire bead assembly, which assembly includes an inextensible bead core, an apex strip, and a gum tie strip, said apparatus comprising circumferentially continuous support means rotatable about an axis and comprising a cylindrical surface having a diameter less than the inside diameter of said bead core, said cylindrical surface provided by a first inflatable means, a conical surface having a reference diameter greater than the inside diameter of said bead core and sloping radially outward and axially away from said cylindrical surface, said conical surface provided by a second inflatable means, and a third surface extending slopingly from said cylindrical surface to said conical surface, said third surface provided by a noninflatable elastically deformable circumferential member of triangular cross-section having an annular fabric web attached integrally to said member and secured radially inwardly of and between the adjacent ends of said cylindrical and said conical surface, annular forming means mounted for movement coaxially of said support means for placing said bead core coaxially of said support means including a rigid ring having a radially inner surface having a diameter greater than the outside diameter of said first inflatable means and having a first annular surface sloping radially outwardly and axially away relatively of said support means at an angle of from 25 to 30 degrees, said sloping surface being roughened as by knurling, and centering means comprising a circular array of deformable spring fingers disposed immediately adjacent and outwardly of the radially inner surface of said annular forming means and movable coaxially relatively of said forming means to extend said fingers outwardly beyond said first annular surface and to retract said fingers axially inward with respect to said sloping surface, and means for selectively inflating said first and said second bladder.

* * * * *